United States Patent
Mishra et al.

(10) Patent No.: US 10,044,606 B2
(45) Date of Patent: Aug. 7, 2018

(54) CONTINUITY CHECK SYSTEMS AND METHODS USING HARDWARE NATIVE DOWN MAINTENANCE END POINTS TO EMULATE HARDWARE UP MAINTENANCE END POINTS

(71) Applicant: Ciena Corporation, Hanover, MD (US)

(72) Inventors: Rajneesh Mishra, Vaishali (IN); Brett Caldwell, Nepean (CA); Mohit Batra, Derawal Nagar (IN); Tajeshwar Gill, Haryana (IN)

(73) Assignee: Ciena Corporation, Hanover, MD (US)

( * ) Notice: Subject to any disclaimer, the term of this patent is extended or adjusted under 35 U.S.C. 154(b) by 359 days.

(21) Appl. No.: 14/797,761

(22) Filed: Jul. 13, 2015

(65) Prior Publication Data
US 2016/0352624 A1 Dec. 1, 2016

(30) Foreign Application Priority Data

Jun. 1, 2015 (IN) .......................... 1565/DEL/2015

(51) Int. Cl.
| | | |
|---|---|---|
| *H04L 12/703* | (2013.01) | |
| *H04L 12/721* | (2013.01) | |
| *H04L 12/939* | (2013.01) | |
| *H04L 12/26* | (2006.01) | |
| *H04L 12/24* | (2006.01) | |

(52) U.S. Cl.
CPC .......... *H04L 45/28* (2013.01); *H04L 43/0805* (2013.01); *H04L 45/66* (2013.01); *H04L 49/557* (2013.01); *H04L 41/145* (2013.01)

(58) Field of Classification Search
CPC ..... H04L 45/28; H04L 45/66; H04L 43/0811; H04L 43/0855; H04L 49/557; H04L 41/145
See application file for complete search history.

(56) References Cited

U.S. PATENT DOCUMENTS

| | | |
|---|---|---|
| 7,535,831 B2 | 5/2009 | Phelps et al. |
| 8,687,501 B1 | 4/2014 | Schultz |
| 8,730,815 B2 | 5/2014 | Sanguineti et al. |
| 8,737,198 B1 | 5/2014 | Holness et al. |
| 8,982,710 B2 | 3/2015 | Meilik et al. |

(Continued)

OTHER PUBLICATIONS

"Connectivity Fault Management," IEEE Computer Society, Dec. 17, 2007, pp. 1-1-260.

(Continued)

*Primary Examiner* — Walter J Divito
*Assistant Examiner* — Anthony Luo
(74) *Attorney, Agent, or Firm* — Clements Bernard Walker PLLC; Christopher L. Bernard; Lawrence A. Baratta, Jr.

(57) ABSTRACT

A node configured to emulate a hardware UP Maintenance End Point (MEP) using one or more DOWN MEPs includes a plurality of ports; a switching fabric configured to switch data between the plurality of ports; and processing circuitry communicatively coupled to the plurality of ports and configured to emulate an UP MEP on a first port of the plurality of ports using at least a first DOWN MEP on a second port of the plurality of ports. The DOWN MEP can be implemented in hardware on the second port and the processing circuitry can be configured to execute application software configured to emulate the UP MEP.

18 Claims, 14 Drawing Sheets

(56) References Cited

U.S. PATENT DOCUMENTS

| | | | |
|---|---|---|---|
| 2010/0238808 A1* | 9/2010 | Salam | H04L 12/4641 |
| | | | 370/241.1 |
| 2012/0087232 A1 | 4/2012 | Hanabe et al. | |
| 2014/0071825 A1 | 3/2014 | Chhabra et al. | |
| 2014/0133289 A1 | 5/2014 | Jadav et al. | |
| 2015/0229552 A1* | 8/2015 | Saltsidis | H04L 43/0811 |
| | | | 370/241.1 |
| 2015/0242885 A1* | 8/2015 | Alsina | G06Q 30/0244 |
| | | | 705/14.43 |
| 2015/0358255 A1* | 12/2015 | Kariya | H04L 43/50 |
| | | | 370/241.1 |

OTHER PUBLICATIONS

"OAM functions and mechanisms for Ethernet based networks," International Telecommunication Union, Nov. 2013, pp. 1-99.
"Ethernet ring protection switching," International Telecommunication Union,, Feb. 2012, pp. 1-104.

* cited by examiner

CONTINUITY CHECK SYSTEMS AND METHODS USING HARDWARE NATIVE DOWN MAINTENANCE END POINTS TO EMULATE HARDWARE UP MAINTENANCE END POINTS

CROSS-REFERENCE TO RELATED APPLICATION(S)

The present patent application/patent claims the benefit of priority of Indian Patent Application No. 1565/DEL/2015, filed on Jun. 1, 2015, and entitled "CONTINUITY CHECK SYSTEMS AND METHODS USING HARDWARE NATIVE DOWN MAINTENANCE END POINTS," the contents of which are incorporated in full by reference herein.

FIELD OF THE DISCLOSURE

The present disclosure generally relates to networking systems and methods. More particularly, the present disclosure relates to continuity check systems and methods using hardware native DOWN Maintenance End Points (MEPs) to emulate hardware UP MEPs.

BACKGROUND OF THE DISCLOSURE

IEEE 802.1ag (IEEE Standard for Local and Metropolitan Area Networks Virtual Bridged Local Area Networks Amendment 5: Connectivity Fault Management) defines protocols and practices for Carrier Ethernet Operations, Administration, and Maintenance (OAM), the contents of which are incorporated by reference herein. It is an amendment to IEEE 802.1Q-2005 and was approved in 2007. IEEE 802.1ag is largely identical to ITU-T Recommendation G.8013/Y.1731 (11/13) "OAM functions and mechanisms for Ethernet based networks", which additionally addresses performance management, the contents of which are also incorporated by reference herein. UP MEP functionality is widely used by service providers to monitor the end-to-end operation of Layer 2 services at the entry and exit of their maintenance domains. In today's competitive market, 99.999% service availability is of paramount importance to the providers. Therefore, it is imperative to enable OAM on all the services offered to the customers with the help of UP MEP functionality. In order to meet scalability requirements, Connectivity Fault Management (CFM) functionality is implemented in hardware versus software. Hardware manufacturers, such as Application Specific Integrated Circuits (ASIC) manufacturers and the like, have also reacted to market needs and tried to integrate OAM functionality within circuitry. However, most of the on-chip OAM solutions offer DOWN MEP functionality that only monitors service continuity of a point-to-point connection. Because DOWN MEPs don't fit into a provider's requirement of monitoring service connectivity between entry and exit of its maintenance domain, Layer 2 switching solutions have to deploy additional hardware (e.g., Network Processors (NPU), Field Programmable Gate Arrays (FPGAs), etc.) to implement scalable UP MEP functionality. Software-based UP MEP solutions scale poorly and do not comply with warm restart requirements (i.e., maintaining operation during a software restart).

BRIEF SUMMARY OF THE DISCLOSURE

In an exemplary embodiment, a node configured to emulate a hardware UP Maintenance End Point (MEP) using one or more DOWN MEPs includes a plurality of ports; a switching fabric configured to switch data between the plurality of ports; and processing circuitry communicatively coupled to the plurality of ports and configured to emulate an UP MEP on a first port of the plurality of ports using at least a first DOWN MEP on a second port of the plurality of ports. The DOWN MEP can be implemented in hardware on the second port and the processing circuitry can be configured to execute application software configured to emulate the UP MEP. The UP MEP can comply with IEEE 802.1ag on one of an E-LINE or E-LAN service formed in part by the second port. The UP MEP can be further emulated using a second DOWN MEP on a third port of the plurality of ports, wherein the processing circuitry can be configured to create an entity on each of the first DOWN MEP and the second DOWN MEP to transmit and receive Continuity Check Messages (CCMs). The processing circuitry can be configured to correlate events between the first DOWN MEP and the second DOWN MEP to maintain an accurate state of an associated remote MEP. The first DOWN MEP and the second DOWN MEP can be each located on a different hardware unit. The DOWN MEP can be configured to transmit and receive Continuity Check Messages (CCMs) without involvement of application software executed on the processing circuitry until an event is detected based on the CCMs. The processing circuitry can be configured to emulate the UP MEP based on the first DOWN MEP on the second port and one or more DOWN MEPs, each associated with a port of the plurality of ports. The processing circuitry can be configured to process faults from an active DOWN MEP of the first DOWN MEP and the one or more DOWN MEPs based on monitoring owner slot and logical port information. The processing circuitry can be configured to monitor for Spanning Tree Protocol or G.8032 Ethernet Ring Protection Protocol state transitions and adjust Continuity Check Message (CCM) transmission on the first DOWN MEP accordingly.

In another exemplary embodiment, a method, in a node, for emulating an UP Maintenance End Point (MEP) using one or more DOWN MEPs includes creating the UP MEP on a client port; creating a Tx entity for a DOWN MEP on each of one or more forwarding line ports and creating a Rx processing entity for a DOWN MEP on one or more line ports based on received Continuity Check Messages (CCMs); exchanging, via associated Tx entities and Rx processing entities, CCMs with one or more remote MEPs through the one or more line ports; and processing data from the CCMs by the Rx processing entities associated with the DOWN MEP on the one or more line ports. Each DOWN MEP can be implemented in hardware. The UP MEP can comply with IEEE 802.1ag on one of an E-LINE or E-LAN service. The method can further include correlating events from the data to maintain an accurate state of an associated remote MEP. At least two DOWN MEPs can be located on a different hardware device. The Tx entities and the Rx processing entities can be configured to transmit and receive CCMs for the processing step without involvement of application software executed on processing circuitry until an event is detected based on the CCMs. The UP MEP on the client port can be emulated based on the Tx entities and the Rx processing entities. The method can further include processing faults from an active DOWN MEP based on monitoring owner slot and logical port information. The method can further include monitoring for Spanning Tree Protocol or G.8032 Ethernet Ring Protection Protocol state transitions and adjusting CCM transmission on the Tx entities accordingly.

In a further exemplary embodiment, a network includes a plurality of interconnected nodes including an Ethernet service between a first node and second node of the plurality of interconnected nodes; wherein a plurality of DOWN Maintenance End Points (MEPs) are implemented in hardware on devices used in the Ethernet service; and wherein an UP MEP is emulated between client ports of the Ethernet service using the plurality of DOWN MEPs and circuitry configured to manage and correlate events from the plurality of DOWN MEPs.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, continuity check systems and methods are described using hardware native DOWN Maintenance End Points (MEPs) to emulate UP MEPs. The systems and methods use a standards-compliant hardware Point-to-Point DOWN MEP implementation to offload a host operating system to emulate standards-compliant UP MEP, such as on E-LINE or E-LAN services. E-LINE services connect two customer Ethernet ports over a Wide Area Network (WAN). E-LAN services are multi-point services connecting a set of customer endpoints, giving the appearance of a bridged Ethernet network connecting the sites. The systems and methods include logic that emulates an UP MEP by creating one or more shadow Continuity Check Message (CCM) Tx entity hardware endpoints, which are described in additional detail herein, corresponding to an UP MEP. Network topology changes can result in having more than one shadow CCM Rx processing entity hardware endpoint, which is described in additional detail herein, for a given Remote MEP, and for an UP MEP, event correlation logic determines the accurate state of the Remote MEP between one or more shadow CCM Rx processing entity hardware endpoints.

The systems and methods include UP MEP emulation using Down MEP CCM Tx and Rx Entities associated with hardware DOWN MEPs. The systems and methods are configured to program hardware with the "CCM Tx entity" at each forwarding UP MEP line port. Run-time Spanning Tree Protocol (STP) or G.8032 state transitions are monitored, and in case of a "forwarding->blocked" transition of any line side port, the "CCM Tx entity" is removed from that port, and, in case of "blocked->forwarding" transition of any line side port, a "CCM Tx entity" is programmed on that port. G.8032 state transitions are described in ITU Recommendation G.8032/Y.1344 (02/12) "Ethernet ring protection switching," the contents of which are incorporated by reference herein. Application software process unknown CCMs from remote MEPs to configure a "CCM Rx processing entity" on the port receiving the CCMs. As a typical Layer-2 (L2) network prevents looping using Loop Prevention mechanisms (e.g., STP, G.8032 etc.), CCMs generated by a far end MEP shall be received on only one line port, at any given point in time and the "CCM Rx processing entity" programmed at that port only shall be considered active. The systems and methods record owner slot and port (or logical port) information to identify an active "CCM Rx processing entity". Application software performs fault detection by listening to hardware reported events and correlating them intelligently.

Figure 1:
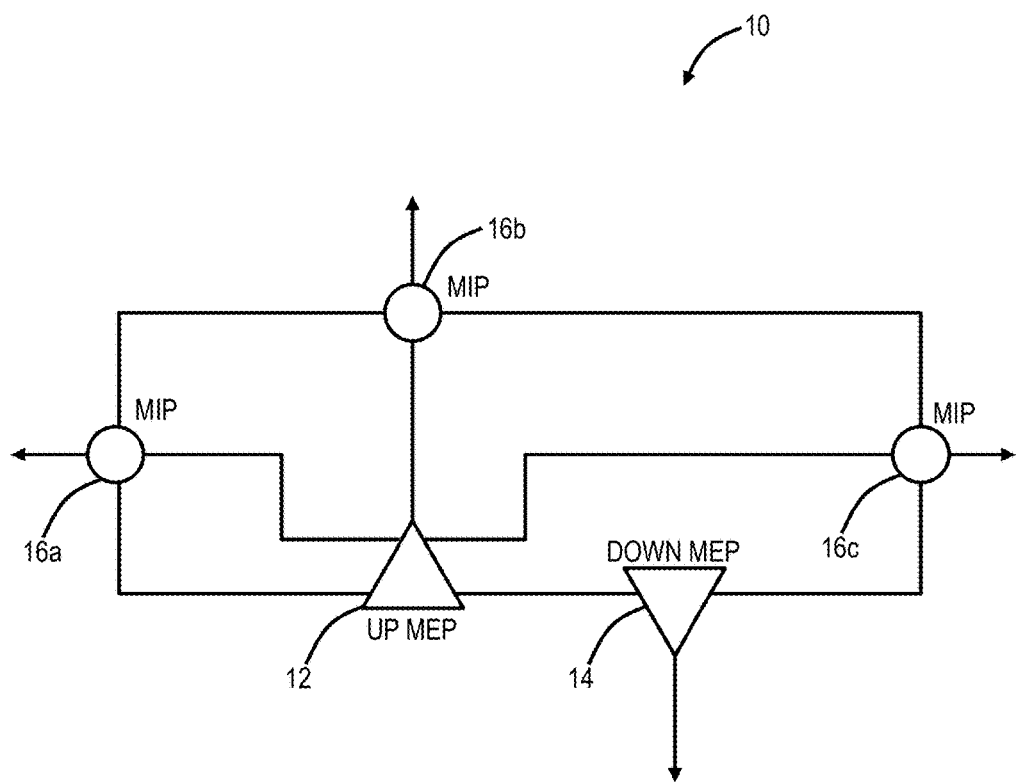
FIG. 1 is a block diagram of a node with various ports capable of Ethernet OAM.

Referring to FIG. 1, in an exemplary embodiment, a block diagram illustrates a node 10 with various ports capable of Ethernet OAM. The node 10 includes an UP MEP 12 and a DOWN MEP 14. Each MEP 12, 14 is a point at an edge of a maintenance domain (MD) which defines the boundary of the domain, and each MEP 12, 14 is configured to send and receive CFM frames. The MD is a management space on a network, typically owned and operated by a single entity. MDs are configured with Names and Levels, and a hierarchical relationship exists between domains based on levels. A Maintenance Association (MA) defines a set of MEPs, all of which are configured with the same MAID (Maintenance Association Identifier) and MD Level, each of which is configured with a MEPID unique within that MAID and MD Level, and all of which are configured with the complete list of MEPIDs. The UP MEP 12 is connected to Maintenance domain Intermediate Points (MIP) 16a, 16b, 16c. The MIPs 16 are points internal to a domain, not at the boundary. The MIPs 16 are passive points, responding only when triggered, such as by CFM traceroute and loopback messages.

FIG. 1 is used to illustrate the differences between the UP MEP 12 and the DOWN MEP 14. MEPs have a direction and different behavior based on where they face (UP vs. DOWN). The DOWN MEP 14 receives CFM frames or Protocol Data Units (PDUs) from the network and transmits CFM frames or PDUs towards the network. The UP MEP 12 receives CFM frames or PDUs from a switch's bridging function and sends CFM PDUs towards the bridging function.

Figure 2:
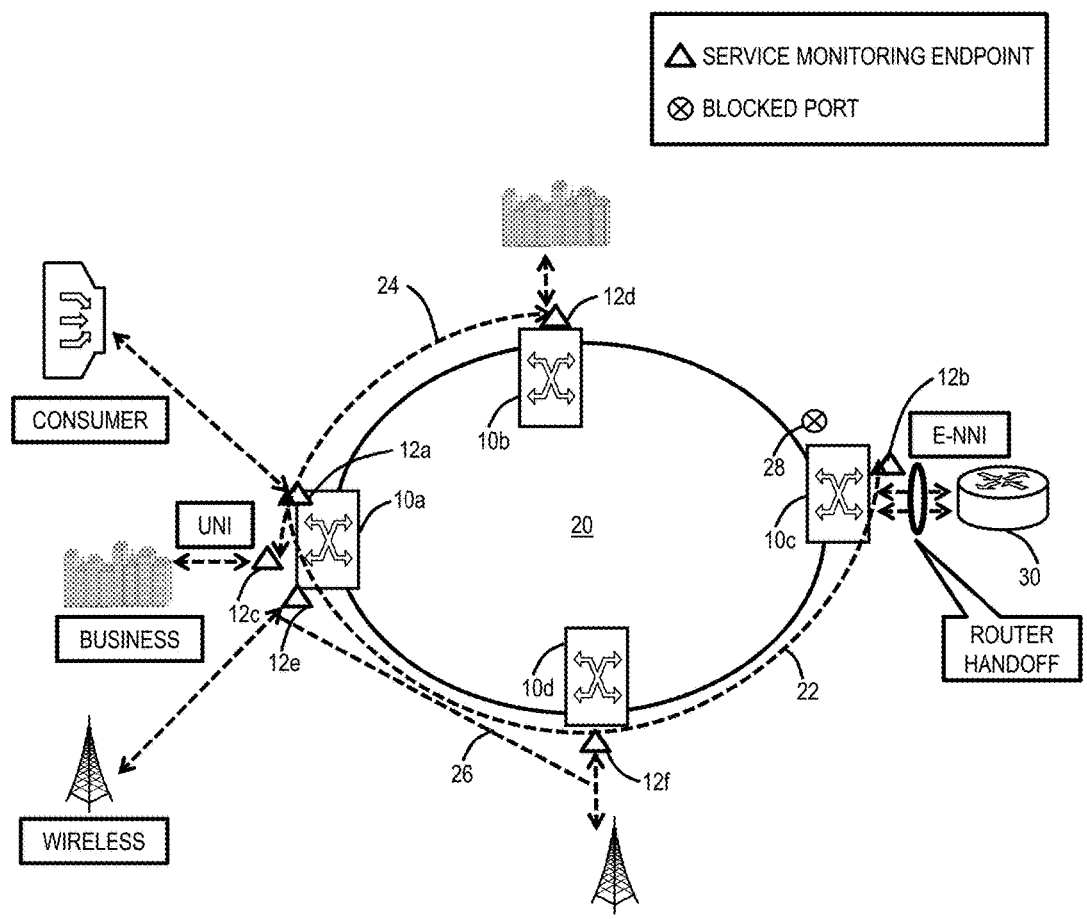
FIG. 2 is a network diagram of a network with interconnected node illustrating services with UP MEPs.
Figure 3:
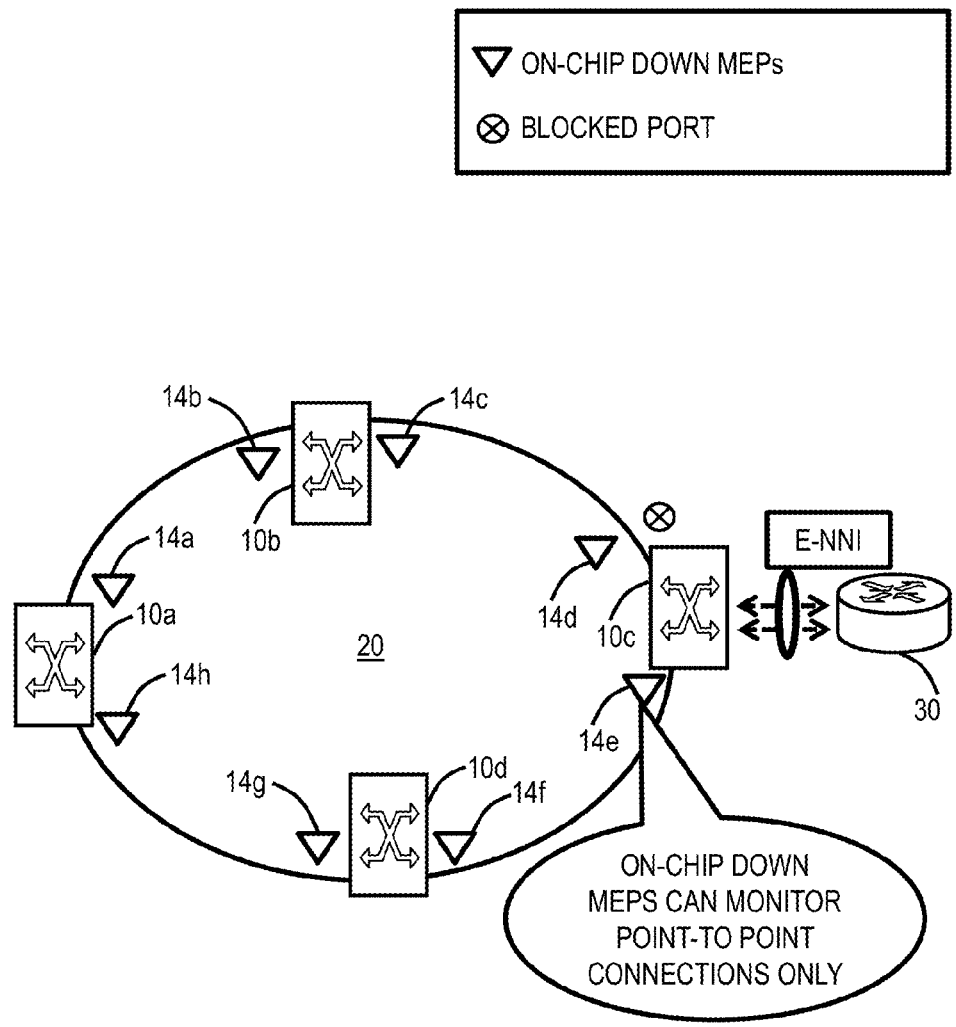
FIG. 3 is a network diagram of the network of FIG. 2 with hardware DOWN MEPs.

Referring to FIGS. 2 and 3, in an exemplary embodiment, network diagrams illustrate a network 20 with interconnected nodes 10a, 10b, 10c, 10d. In FIG. 2, the network 20 includes services 22, 24, 26, specifically the service 22 is between the nodes 10a, 10c, the service 24 is between the nodes 10a, 10b, and the service 26 is between the nodes 10a, 10d. Each of the services 22, 24, 26 have an associated UP MEP 12, specifically the service 22 has UP MEPs 12a, 12b, the service 24 has UP MEPs 12c, 12d, and the service 26 has UP MEPs 12e, 12f. The network 20 includes a blocked port 28 installed at the node 10c facing the node 10b. Also, the network 20 can include an External Network-Network Interface (E-NNI) router handoff between the node 10c and a router 30 and various User-Network Interface (UNI) handoffs at the nodes 10a, 10b, 10d. The UP MEPs 12a-12f are utilized for service monitoring to achieve 99.999% availability on all the services 22, 24, 26 offered to end customers. i.e., at the edges of the maintenance domains. Note, the network 20 is shown for illustration purposes and those of ordinary skill in the art will recognize that other embodiments are also contemplated. FIG. 3 illustrates MEP support in the network 20 in hardware. Specifically, circuitry in the nodes 10a, 10b, 10c, 10d include DOWN MEPs 14a-14h implemented in hardware.

Figure 4:
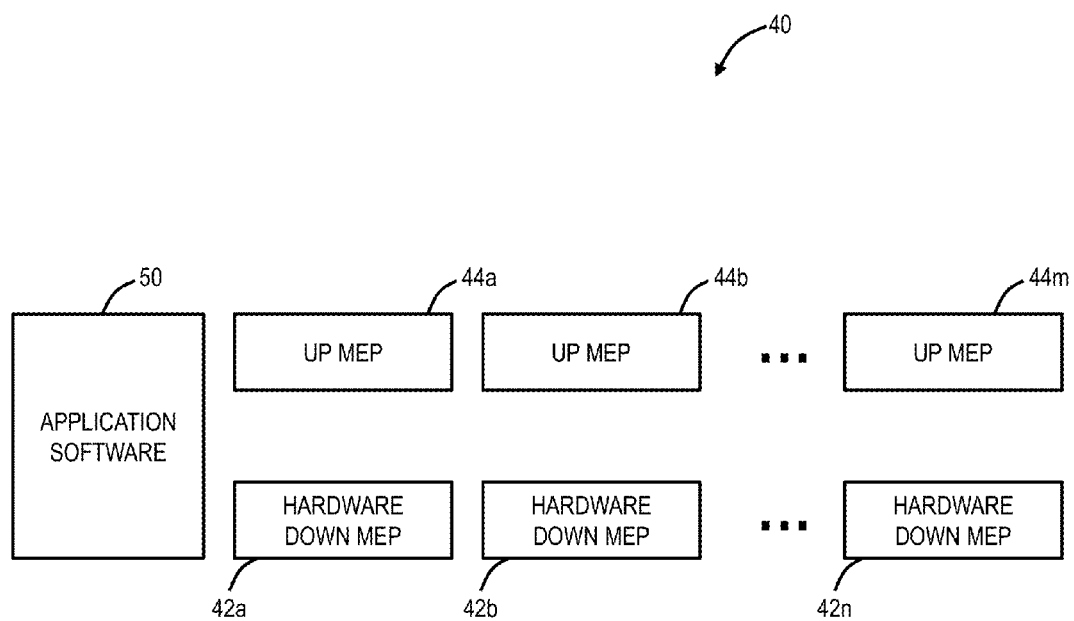
FIG. 4 is a block diagram of an UP MEP system that implements UP MEP functionality using native hardware DOWN MEPs.

Referring to FIG. 4, in an exemplary embodiment, a block diagram illustrates an UP MEP system 40 that implements hardware UP MEP functionality using native hardware DOWN MEPs 42 (referenced as DOWN MEPs 42a, 42b, 42n). The DOWN MEPs 42 are used to implement UP MEPs 44 (referenced as UP MEPs 44a, 44b, 44m) with intermediate application software 50 configured to use the DOWN MEPs 42 to implement the UP MEPs 44. Note, because there is not a one-to-one mapping between the DOWN MEPs 42 and the UP MEPs 44, m may or may not equal n. The systems and methods leverage native DOWN MEP CCM functionality in the DOWN MEPs 42 to implement UP MEP CCM functionality in the nodes 10, such as L2 switches based on centralized or multi-slot distributed architecture. Specifically, the DOWN MEPs 42 are hardware-based, and the UP MEPs 44 can be referred to as emulated hardware-based. That is, the UP MEPs 44 are formed by the hardware-based DOWN MEPs 42 and the application software 50. The application software 50 is configured to modify the native hardware DOWN MEP 42 functionality to emulate the UP MEPs 44. That is, the UP MEP system 40 utilizes the native hardware DOWN MEPs 42 functionality along with software processes of the application software 50 to modify the hardware native DOWN MEP functionality to emulate UP MEP functionality. The UP MEP system 40 is scalable, complies with warm start requirements and works on E-LINE as well as E-LAN L2 services. The DOWN MEPs 42 monitors L2 service connectivity on a point-to-point link and reports IEEE 802.1ag defined faults in the monitored point-to-point connection to the application software 50. The UP MEP system 40 builds an UP MEP CCM messaging solution over the hardware native DOWN MEP CCM functionality with the following functional requirements:

i) Support provisioning of a Maintenance Association to assist CCM generation and to validate receive direction "Maintenance Association" attributes (e.g. MAID, MD level, etc.), and this functionality is referred as an "MA entity" subsequently;

ii) Include a CCM transmission entity that transmits CCMs on a specified egress port, on a per Maintenance Association per egress port basis, and this functionality is referred to as a "CCM Tx entity";

iii) Include a CCM receiver and Rx processing entity which validates incoming CCMs arriving at a specified ingress port against configured MA attributes (MD level, MAID, CCM interval) and remote MEP ID, and this is referred as a "CCM Rx processing entity";

iv) Maintain MA state and Remote MEP state and reports CCM defects set and clear transitions to application software;

v) The CCM Rx processing entity works independent of the CCM Tx entity;

vi) Support more than one "CCM Rx processing entities" per port per MA to support more than one remote MEP per DOWN MEP;

vii) Support overriding of eventual drop behavior of CCMs processed and resolved by the "CCM Rx processing entity";

viii) Support CCM generation at all standard defined intervals;

ix) Support configuration of "Port status" and "Interface Status" Type-Length-Value (TLV) fields;

x) Support programming of Remote Defect Indicator (RDI) flag by application software;

xi) Support reporting unknown CCMs to application software to allow remote MEPs auto-discovery; and xii) Support reporting error CCMs to application software to record error CCMs.

As described herein, an UP MEP port (i.e., a UNI port which has the UP MEP on it) is referred to as a client port and the remaining ports of the L2 service are referred to as line ports. Again, the UP MEP system 40 uses the native hardware DOWN MEPs 42 and their associated CCM functionality as a basic building block to achieve UP MEP 44 CCM functionality for a L2 service.

CCM Generation

Ideally an UP MEP transmits CCMs towards the switch's bridging functionality so that bridging logic can determine the line side egress ports and their forwarding state to apply appropriate layer 2 egress transforms. To achieve this behavior, the application software 50 uses one or more of the CCM Tx entities. The CCM Tx entities corresponding to the UP MEP 44 may be on single hardware unit or may be spread over multiple hardware units in case of hardware stacking or multi-slot architecture. That is, there is not necessarily a physical correlation between the DOWN MEPs 42 and the UP MEPs 44 in the UP MEP system.

The CCM Tx entities associated with a single UP MEP 44 has identical attributes other than egress port, and the application software 50 distinguishes between these entities by virtue of hardware identifiers of these entities. Based on hardware support, each UP MEP 44 may have one MA entity for each line side port or have one MA entity per UP MEP 44 per hardware unit. When the UP MEP 44 has one MA entity for each line side port, the application software 50 distinguishes between these MA entities (associated to an UP MEP) by virtue of their hardware identifiers.

The application software 50 determines a forwarding or blocked state of each line side port (or logical port) by listening to STP or G.8032 state transitions. The application software 50 programs the CCM Tx entity at each forwarding line side port including any layer 2 transforms. The CCM attributes are set to what has been configured on the UP MEP 44 by the user. Once configured correctly, the hardware DOWN MEPs 42 keeps on transmitting UP MEP CCMs from all forwarding line side ports of the L2 service without any software intervention by the application software 50. The application software 50 monitors run-time STP or G.8032 state transitions. In case of a forwarding->blocked transition of any line side port, the application software 50 removes the CCM Tx entity from that port. In case of a blocked->forwarding transition of any line side port, the application software 50 creates a new CCM Tx entity on that port.

Maintenance Association Attributes Editing

If a user edits a CFM attribute such as MD name, MA name, MD level or CCM interval, of an UP MEP Maintenance Association, all CCM Tx entities associated to that UP MEP are edited with the new value so that CCMs transmitted subsequently operate according to the edited CFM attribute, e.g., to carry updated MAID, MD level or CCM interval values or generated based on updated CCM interval periodicity. If an UP MEP 44 client port undergoes some transition causing a change in the port status/interface status TLV, an updated value of these TLVs is programmed at all CCM Tx entities associated to that UP MEP 44. If the application software 50 sets/unsets RDI flag for an UP MEP Maintenance Association, an updated value of RDI flag is programmed at all CCM Tx entities associated to that UP MEP 44.

Remote MEP Discovery & Continuity Check Messages Rx Processing

To support remote MEP's auto-discovery, the application software 50 takes advantage of the hardware's capability of notifying unknown CCMs to the application layer. When the software receives CCMs belonging to UP MEP Maintenance Association, the application software 50 validates the received frame against the UP MEP Maintenance Association attributes as recommended by 802.1ag standard. If the MAID and CCM interval are identical and MEP ID of received CCM is different from UP MEP ID, the application software 50 programs the CCM Rx processing entity on the port that has received this unknown CCM. For an UP MEP, the CCM Rx processing entity programmed at any port shares the MA entity with the CCM Tx entity programmed at that port. There can be one CCM Rx processing entity per line side port per RMEP.

In case an E-LAN service supports more than one Remote MEP, multiple CCM Rx processing entities (one per Remote MEP) are programmed at any port for a single UP MEP 44 and all such Rx entities share the MA entity with the CCM Tx entity programmed at that port.

Figure 5:
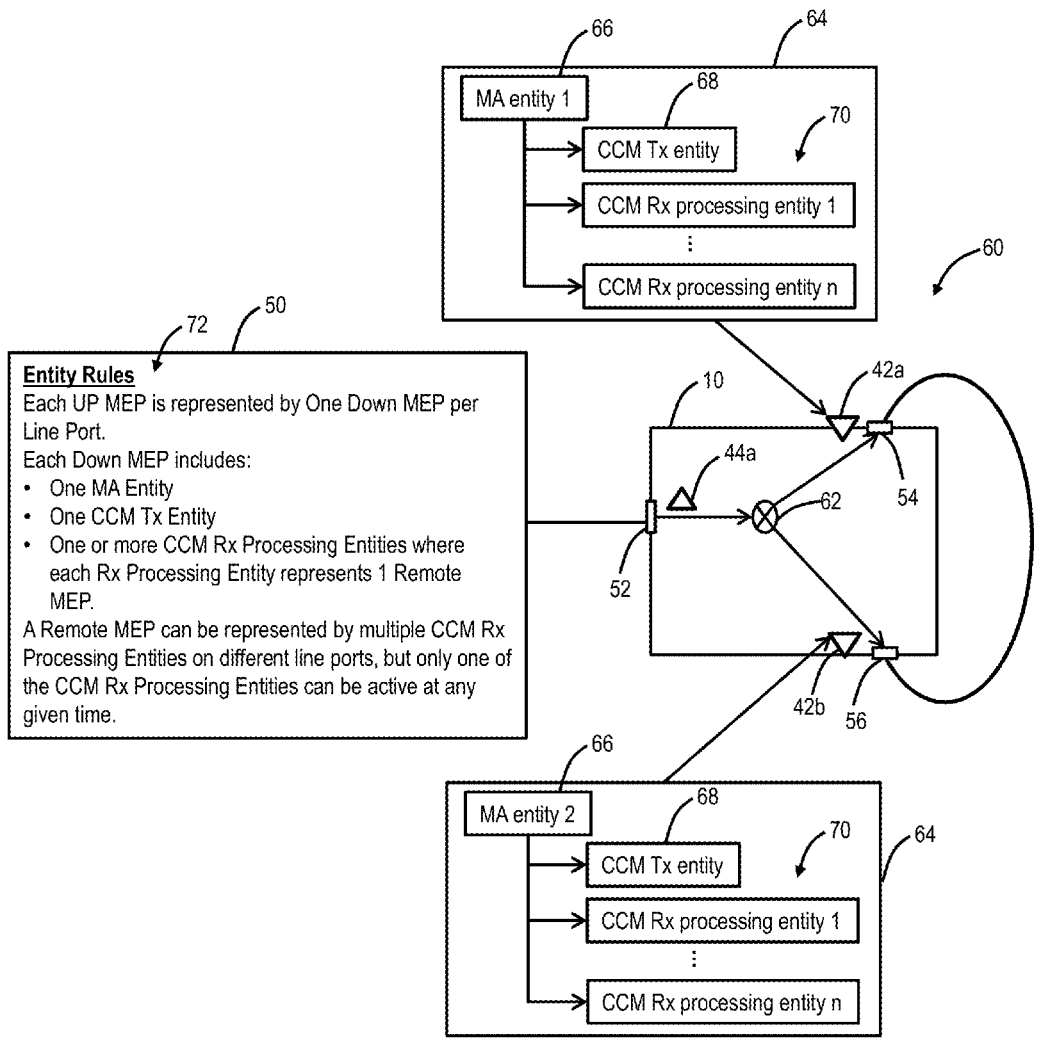
FIG. 5 is a block diagram of an UP MEP Emulation, in a node, by correlating DOWN MEPs.

Referring to FIG. 5, in an exemplary embodiment, a block diagram illustrates a hardware UP MEP Emulation 60, in a node 10, by correlating DOWN MEPs 42*a*, 42*b*. The node 10 includes three ports 52, 54, 56, connected by a bridge 62. In this example, there are two DOWN MEPs 42*a*, 42*b*, each associated with one of the ports 54, 56. The DOWN MEPs 42*a*, 42*b* are implemented in hardware on the ports 54, 56. The application software 50 is used to emulate an UP MEP 44*a* with the DOWN MEPs 42*a*, 42*b*. Specifically, the DOWN MEPs 42*a*, 42*b* are used for their hardware efficiency in generating and processing CCMs, and the application software 50 is utilized to process and correlate events from the CCMs to provide the UP MEP 44*a*. The application software 50 creates an entity set 64 for each of the DOWN MEPs 42*a*, 42*b*. The entity set 64 includes an MA entity 66, a CCM Tx entity 68, and one or more CCM Rx processing entities 70 where each CCM Rx processing entity represents one remote MEP. These entities 66, 68, 70 function as described herein. The application software 50 includes various entity rules 72 for emulating the UP MEP 44*a*.

The entity rules 72 include: 1) each UP MEP 44*a* is represented by one DOWN MEP 42*a*, 42*b* per line port 54, 56 and 2) each DOWN MEP 42*a*, 42*b* includes the entity set 64. In this example, the UP MEP 44*a*, on the line port 52, has two DOWN MEPs 42*a*, 42*b*. A remote MEP can be represented by multiple CCM Rx processing entities on different line ports, but only one of the CCM Rx processing entities can be active at any given time.

As L2 networks have some loop prevention mechanism, CCMs from a particular remote MEP should arrive on one port only. Once the CCM Rx processing entity 70 is programmed on the port receiving CCMs, the hardware shall process incoming CCMs without software intervention by the application software 50. Additionally, for each remote MEP, the application software 50 records the owner slot and owner port (or logical port) on which it has received the remote MEP. Additionally, the application software 50 updates this information dynamically based on run-time network topology changes.

The CCM Rx processing entity 70 remains programmed on the port 54, 56 irrespective of "forwarding->blocked" or "blocked->forwarding" transitions of that port 54, 56. This is intentional to keep the CCM Rx processing entity 70 programmed on a blocked port so that hardware can report events even in complete network outage scenarios (in which all line ports 54, 56 have entered into the blocked state). Therefore, there can be more than one CCM Rx processing entities 70 programmed in hardware. Multiple CCM Rx processing entities 70 corresponding to the UP MEP 44*a* may be on a single hardware unit or spread over multiple hardware units. The remote MEP's owner slot and port (or logical port) information can be used by the application software to correlate faults received from the hardware CCM Rx processing entity 70. In case UP MEP functionality is required on E-LAN services, the hardware has to be programmed to override DOWN MEP CCMs drop behavior by forwarding CCMs to other line side ports. For example, the ports 54, 56 can forward CCMs to one another via the bridge 62.

IEEE 802.1ag CCM Fault Detection on Maintenance Association and Remote MEP

Figure 6:
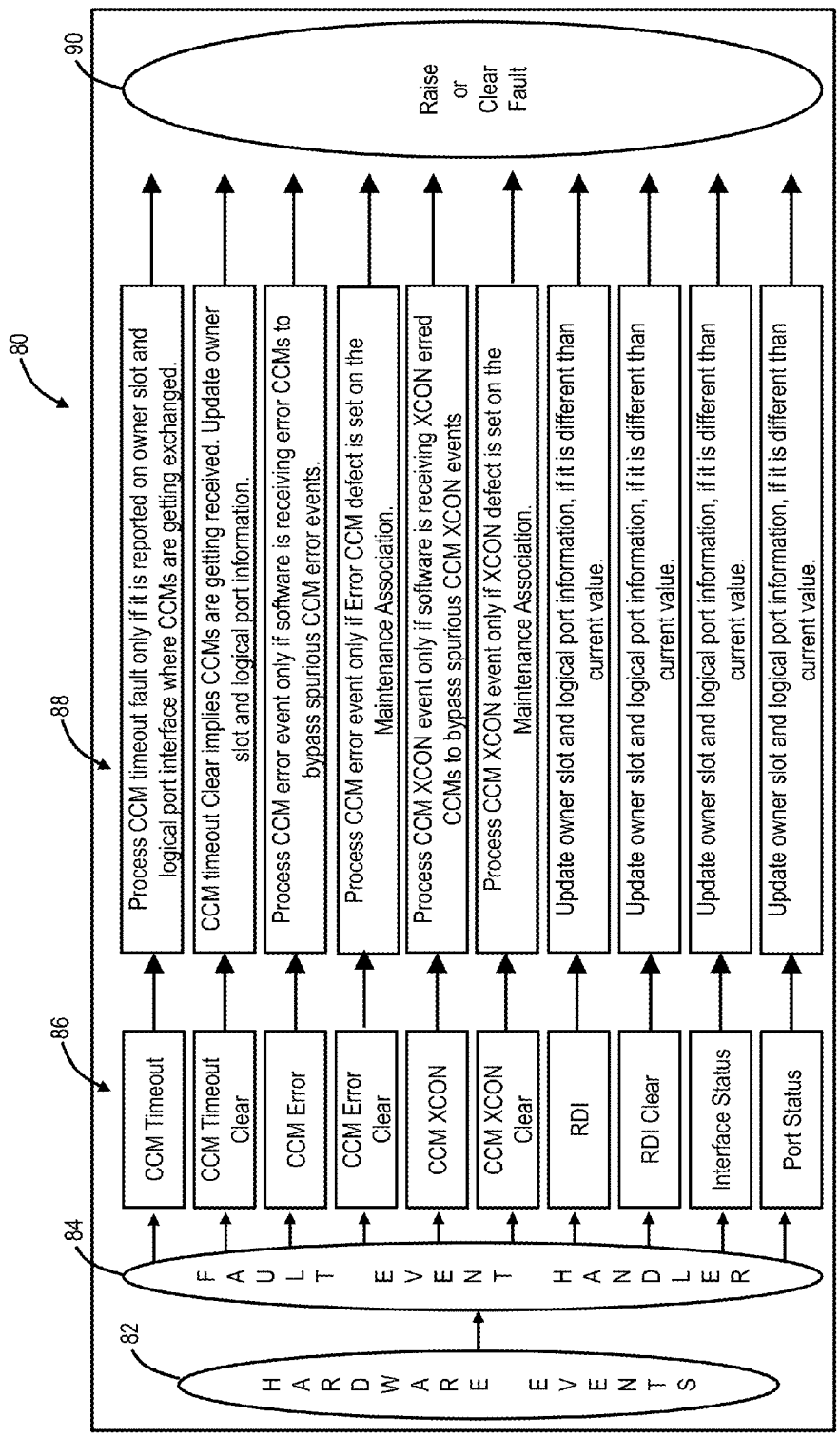
FIG. 6 is a flow diagram illustrates a process for filtering and processing hardware reported events, from the DOWN MEPs to emulate the UP MEP.

Referring to FIG. 6, in an exemplary embodiment, a flow diagram illustrates a process 80 implemented by the application software 50 for filtering and processing hardware reported events, from the DOWN MEPs 42 to emulate the UP MEP 44. As there can be more than one CCM Rx processing entity 70 on different line ports 54, 56 corresponding to the same remote MEP, the application software 50 implements the process 80 to discard spurious events reported from inactive CCM Rx processing entities 70. The process 80 also allows the application software 50 to process and notify events from an active CCM Rx processing entity 70 to a CFM Fault Notification Generator on the basis of owner slot, owner port (or logical port), software received frames and its mapping between software entities and hardware entities.

Fault detection is processed by the CCM Rx processing entity 70. To support fault detection for the UP MEP 44, which internally is being emulated via the DOWN MEPs 42 each line port, the process 80 is introduced such that the faults are only processed by the CCM Rx processing entity that has the active CCM bi-directional flow. To support this, a concept of owner slot and owner logical port is introduced, which gets updated dynamically with the slot/port information on which there an active bi-directional CCM flow.

The process 80 can be implemented by the application software 50 and responds to hardware events 82 from the DOWN MEPs 42. A fault event handler 84 is used to process the different hardware events 82 which may include various types 86. For each of the types 86, the fault event handler 84 can perform a different action 88 to determine whether or not to raise or clear a fault 90. The types 86 of hardware events 82 can include a CCM Timeout, a CCM Timeout Clear, a CCM Error, a CCM Error Clear, a CCM Cross-Connect (XCON), a CCM XCON Clear, RDI, RDI Clear, Interface Status, and Port Status.

For a CCM Timeout, the process 80 can process a CCM timeout fault only if it is reported on an owner slot and logical port interface where CCMs are getting exchanged. For a CCM Timeout Clear, this implies CCMs are getting received and the process 80 can update the owner slot and logical port information. For a CCM Error, the process 80 can process the error only if the application software 50 is receiving error CCMs to bypass spurious CCM error events. For a CCM Error Clear, the process 80 can process the CCM error event only if an error CCM defect is set in the Maintenance Association. For the CCM XCON, the process 80 can process the CCM XCON event only if the application software 50 is receiving XCON errored CCMs to bypass spurious CCM XCON events. For the CCM XCON Clear, the process 80 can process the CCM XCON event only if XCON defect is set in the Maintenance Association. For the RDI, the RDI Clear, the Interface Status, and the Port Status, the process 80 updates the owner slot and logical port information, if it is different from a current value.

With respect to E-LAN services, the application software 50 can collate a Maintenance Association state and the state of all remote MEPs before declaring fault clear on the Maintenance Association. With respect to an UP MEP Maintenance Association deletion, the application software 50 can clean up associated hardware entities 64 from all line side ports 54, 56.

The various UP MEP CCM functionality described herein i) operates on all standard defined CCM intervals on L2 services carried on unprotected line, and ii) operate at 100 ms and slower CCM intervals on L2 services having more than one line side port and running some loop prevention mechanism (STP or G.8032).

Figure 7:
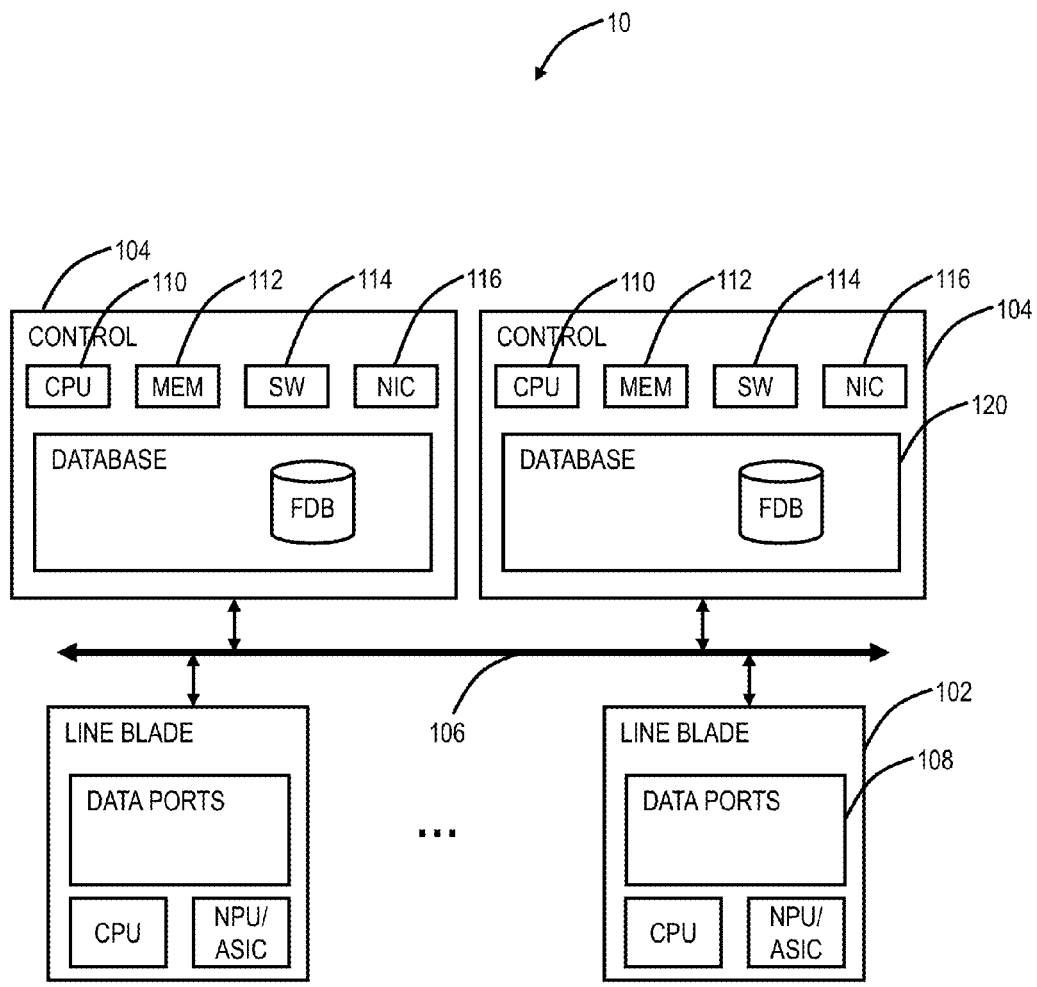
FIG. 7 is a block diagram of an exemplary implementation of a node.

Referring to FIG. 7, in an exemplary embodiment, a block diagram illustrates an exemplary implementation of the node 10. As described herein, the node 10 can also be referred to as a network element, a switch, etc. In this exemplary embodiment, the node 10 is an Ethernet network switch, but those of ordinary skill in the art will recognize the systems and methods described herein contemplate other types of network elements and other implementations. In this exemplary embodiment, the node 10 includes a plurality of blades 102, 104 interconnected via an interface 106. The blades 102, 104 are also known as line cards, line modules, circuit packs, pluggable modules, etc. and refer generally to components mounted on a chassis, shelf, etc. of a data switching device, i.e., the node 10. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 10 out by the correct port 108 to the next node 10. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include a processor (i.e., a CPU) and a network processor (NP)/application specific integrated circuit (ASIC). As described herein, the line blades 102 can include hardware to support the DOWN MEPs 14, 42 and the application software 50 can be implemented in the node 10 to support the UP MEPs 12, 44 based thereon. The application software 50 can be operated on processing circuitry in the node 10, such as one the CPU in the line blades 102, the CPU in the control blades 104, etc.

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this exemplary embodiment, the node 10 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 10.

In an exemplary embodiment, the node 10 can be configured to emulate an UP Maintenance End Point (MEP) using one or more DOWN MEPs. As described above, the node includes a plurality of ports (e.g., the ports 108); a switching fabric configured to switch data between the plurality of ports; and processing circuitry communicatively coupled to the plurality of ports and configured to execute application software configured to emulate an UP MEP on a first port of the plurality of ports using a first DOWN MEP on a second port of the plurality of ports. The DOWN MEP can be implemented in hardware on the second port. The UP MEP can comply with IEEE 802.1ag on one of an E-LINE or E-LAN service formed in part by the second port. The UP MEP can be further emulated using a second DOWN MEP on a third port of the plurality of ports, wherein the application software can be configured to create an entity on each of the first DOWN MEP and the second DOWN MEP to transmit and receive Continuity Check Messages (CCMs). The application software can be configured to correlate events between the first DOWN MEP and the second DOWN MEP to maintain an accurate state of an associated remote MEP. Optionally, the first DOWN MEP and the second DOWN MEP can each be located on a different hardware device. The DOWN MEP can be configured to transmit and receive Continuity Check Messages (CCMs) without the involvement of the application software until an event is detected based on the CCMs. The application software can be configured to emulate the UP MEP based on the first DOWN MEP on the second port and one or more DOWN MEPs, each associated with a port of the plurality of ports. The application software can be configured to process faults from an active DOWN MEP of the first DOWN MEP and the one or more DOWN MEPs based on monitoring owner slot and logical port information. The application software can be configured to monitor for Spanning Tree Protocol or G.8032 Ethernet Ring Protection Protocol state transitions and adjust Continuity Check Message (CCM) transmission on the first DOWN MEP accordingly.

Figure 8A:
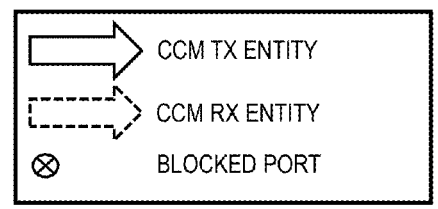
FIGS. 8a-8c are network diagrams of the network of FIGS. 2 and 3 showing UP MEP emulation on an E-LINE service.
Figure 8A:
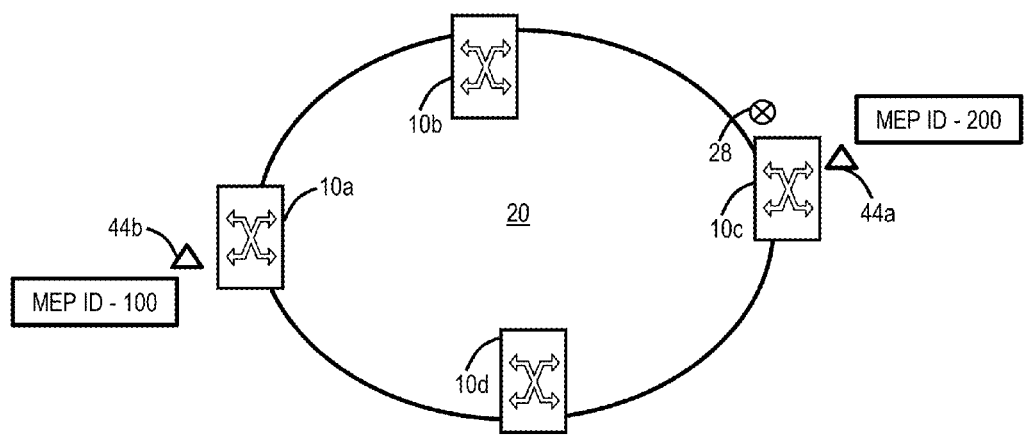
Figure 8B:
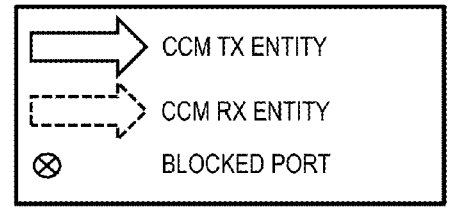
Figure 8B:
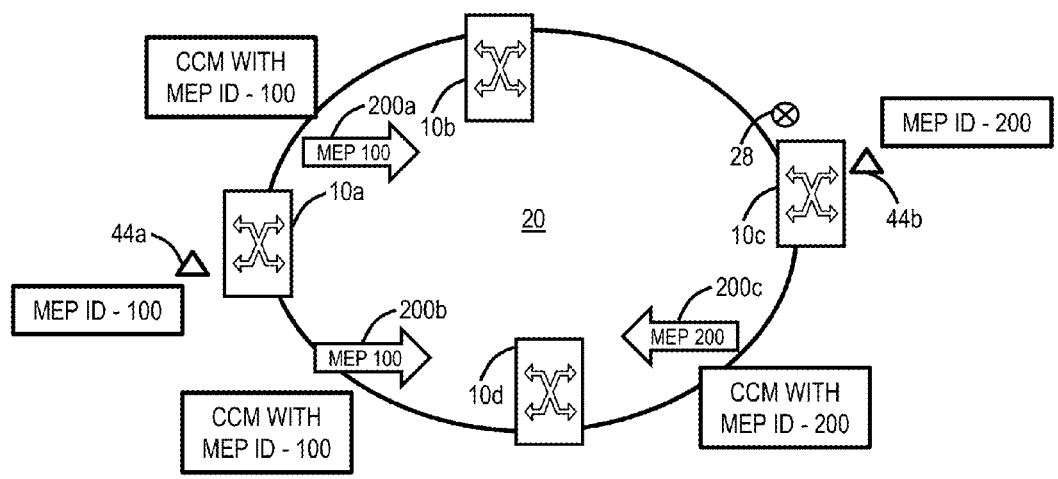
Figure 8C:
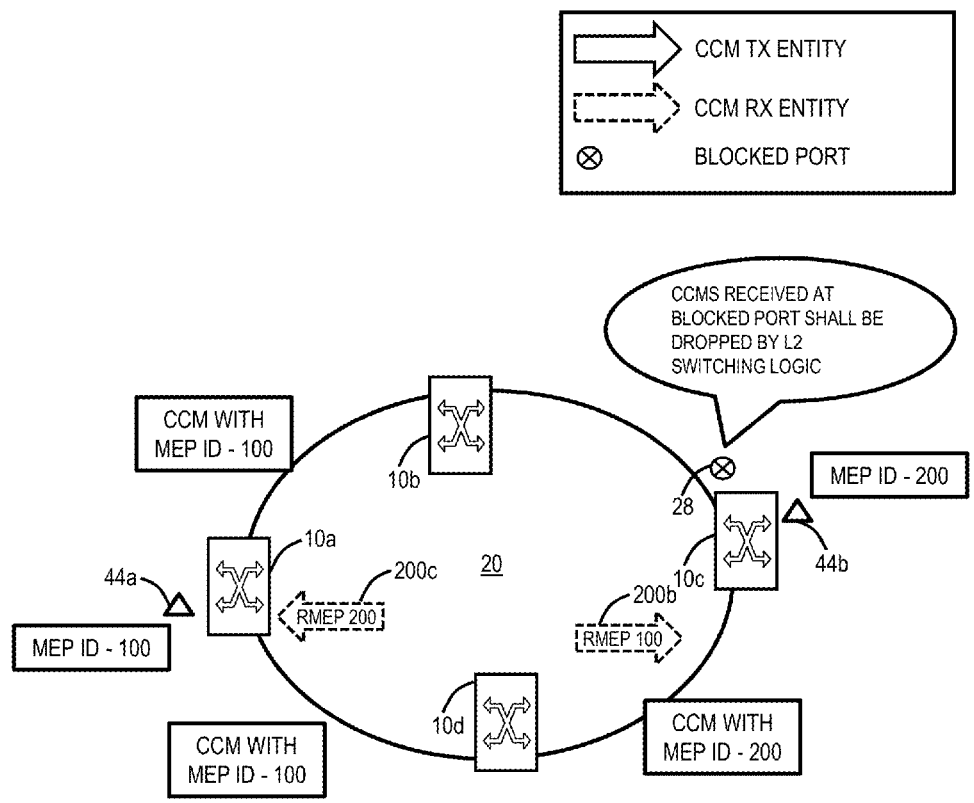

Referring to FIGS. 8a-8c, in an exemplary embodiment, network diagrams illustrates the network 20 showing UP MEP emulation on an E-LINE service. Again, the network 20 includes four nodes 10a, 10b, 10c, 10d in an interconnected ring, and a blocked port 28 installed at the node 10c facing the node 10b. That is, the network includes a plurality of interconnected nodes including an Ethernet service between a first node and second node of the plurality of interconnected nodes. A plurality of DOWN Maintenance End Points (MEPs) are implemented in hardware on devices used in the Ethernet service; and an UP MEP is emulated between client ports of the Ethernet service using the plurality of DOWN MEPs and application software configured to manage and correlate events from the plurality of DOWN MEPs.

In FIG. 8a, to start, UP MEPs 44a, 44b are created at client ports on the nodes 10a, 10c. Here, the UP MEP 44a is assigned a MEP identifier (ID) of 100, and the UP MEP 44b is assigned a MEP ID of 200. In FIG. 8b, next, UP MEP CCMs are transmitted on line ports that have the CCM Tx entity 68 configured. Here, the node 10a will send CCMs 200a, 200b in both directions on the interconnected ring. Specifically, the node 10a has two DOWN MEPs 42, one facing the node 10b and one facing the node 10d, to emulate the UP MEP 44a. The node 10c will only send a CCM 200c in one direction due to the blocked port 28. The node 10c has two DOWN MEPs 42, one facing the node 10b and one facing the node 10d, to emulate the UP MEP 44b, but the DOWN MEP 42 facing the node 10b is configured based on the blocked port 28. In FIG. 8c, CCM Rx processing entities 70 at the nodes 10a, 10c are configured to receive far-end CCMs 200b, 200c. Specifically, the CCM 200b from the node 10a is received and processed by the DOWN MEP 42 at the node 10c (the CCM 200b referred to by the node 10c as being received from Remote MEP (RMEP) 100). The CCM 200c from the node 10c is received and processed by the DOWN MEP 42 at the node 10a (the CCM 200c referred to by the node 10a as being received from Remote MEP (RMEP) 200). Note, the CCM 200a is dropped by L2 switching logic at the node 10c based on the blocked port 28.

Figure 9A:
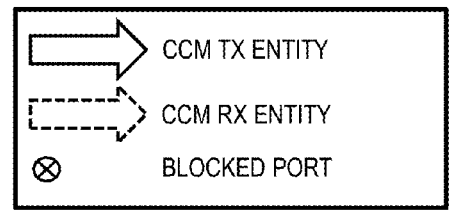
FIGS. 9a-9c are network diagrams of the network of FIGS. 2, 3, and 8a-8c showing UP MEP emulation on an E-Line service with a ring switchover.
Figure 9A:
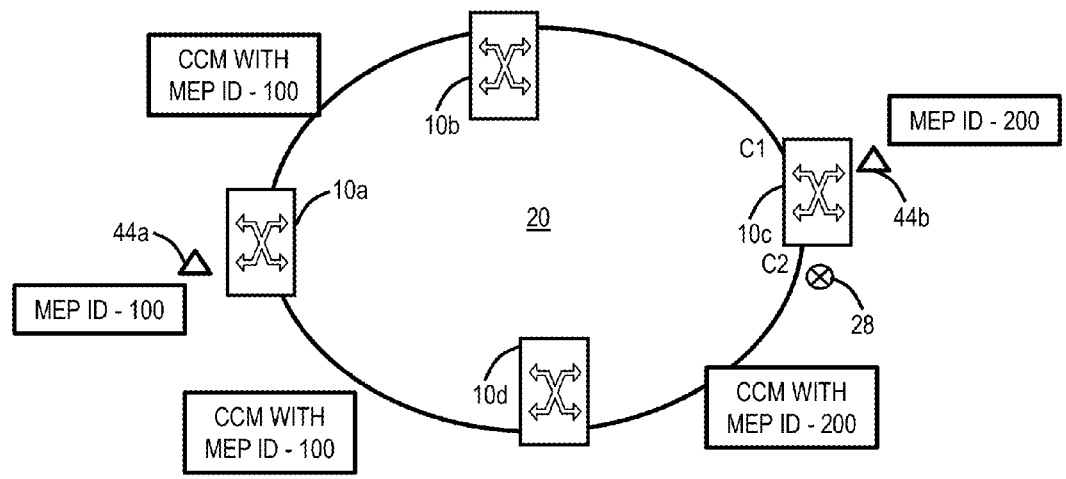
Figure 9B:
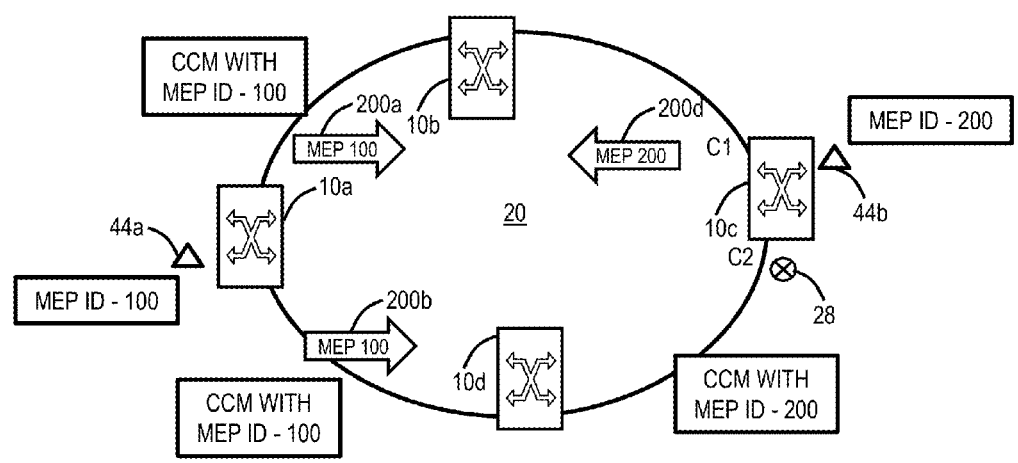
Figure 9C:
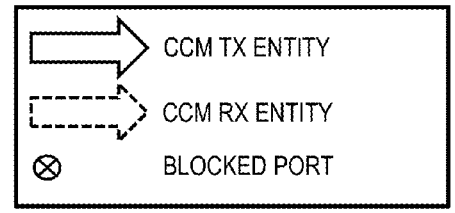
Figure 9C:
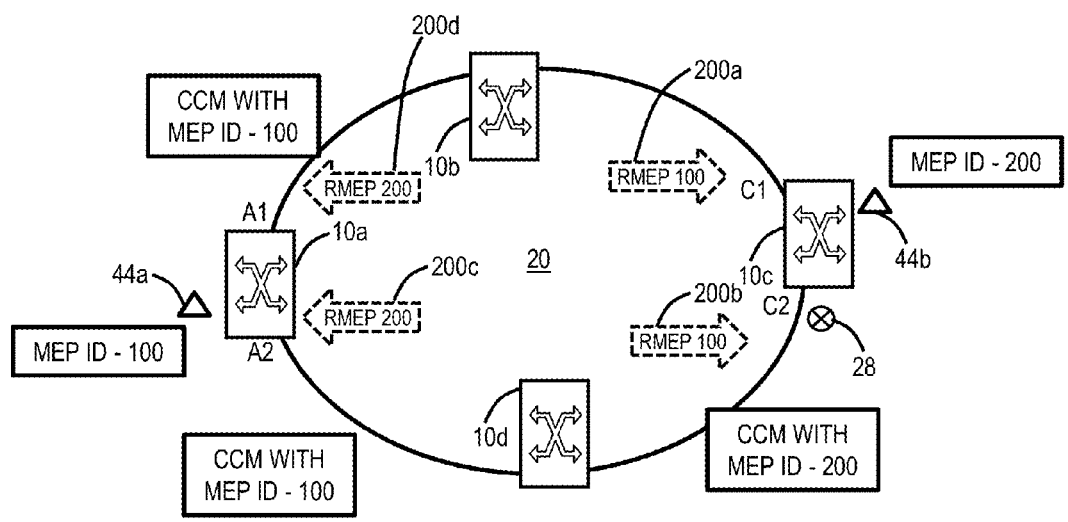

Referring to FIGS. 9a-9c, in an exemplary embodiment, network diagrams illustrate the network 20 showing UP MEP emulation on an E-LINE service with a ring switchover. In FIG. 9a, a ring switchover at the node 10c causes movement of the blocked port 28 to the other side of the node 10c, i.e., facing the node 10d on line port C2. As a result of the ring switchover, a CCM Tx entity 68 is created on line port C1, and the CCM Tx entity 68 existing on the new blocked port B2 is removed to prevent CCMs transmission. In FIG. 9b, the CCMs 200a, 200b, 200d are transmitted. Note, there is no CCM 200c in FIG. 9b due to the location of the blocked port 28. In FIG. 9c, the CCMs are received. Note, for illustration purposes, the CCMs 200b, 200c are shown on line ports A1, A2, although they would be received prior to the ring switchover. A CCM Rx processing entity 70 is programmed on the new active path (between the ports A1, C1) once the RMEP's CCMs 200a, 200d are detected. The CCM Rx processing entity 70 at the block port B2 can remain programmed, but shall be considered inactive. The application software 50 at the node 10a can determine the fault state of the RMEP 200 by analyzing the fault state of the CCM Rx processing entities from the DOWN MEPs 42 on the line ports A1, A2.

Note, the various examples herein have described UP MEP emulation with respect to a ring network. Here, there are two DOWN MEPs 42 for each emulated UP MEP 44. Other embodiments are also contemplated. For example, in a point-to-point network, there is one DOWN MEP 42 for each emulated UP MEP 44, and in interconnected mesh topologies, there may be more than two DOWN MEPs 42 for each emulated UP MEP 44.

Figure 10:
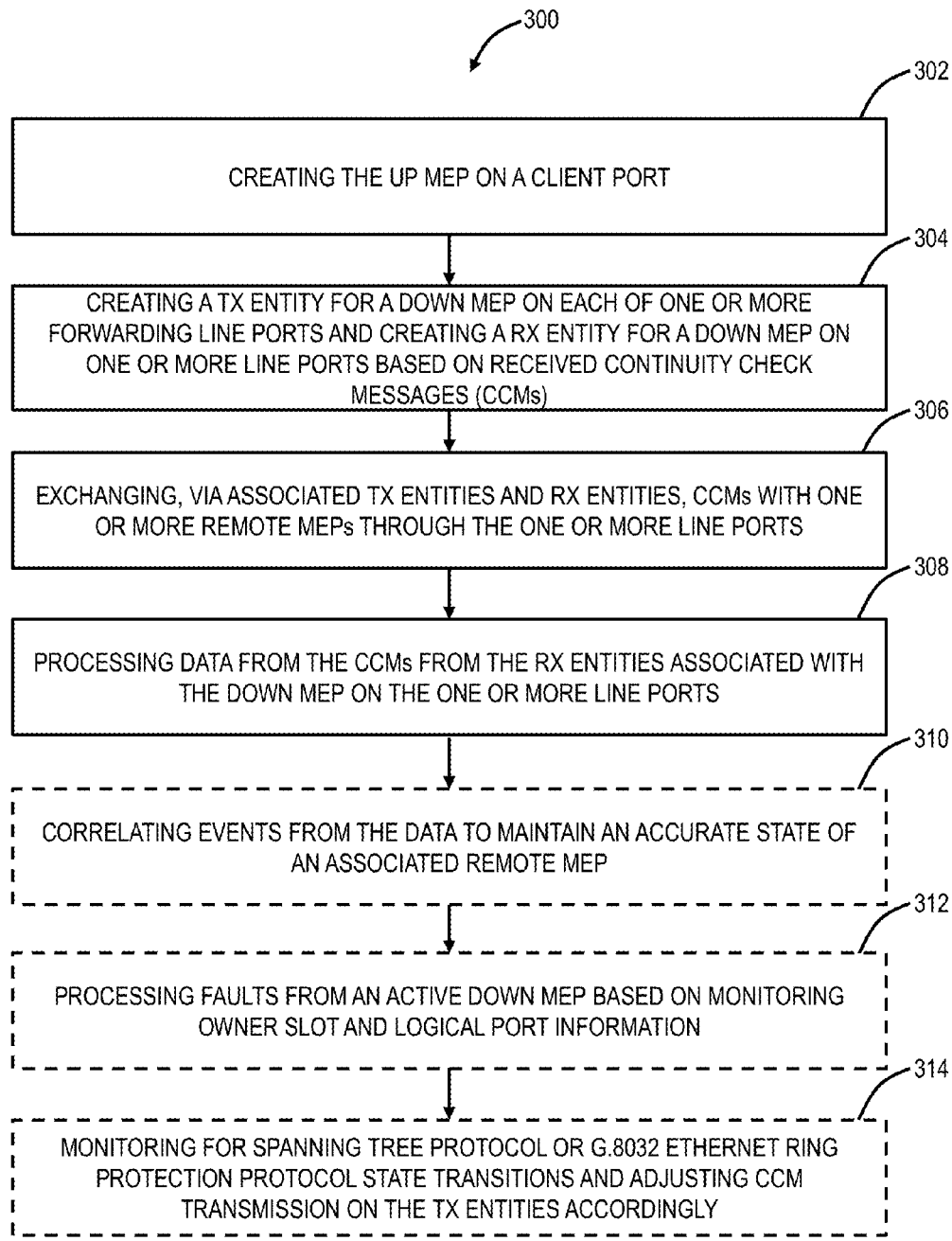
FIG. 10 is a flowchart of a process for emulating an UP Maintenance End Point (MEP) using one or more DOWN MEPs.

Referring to FIG. 10, in an exemplary embodiment, a flowchart illustrates a process 300 for emulating an UP Maintenance End Point (MEP) using one or more DOWN MEPs. The process 300 contemplates operation in the node 10, etc. The process 300 includes creating the UP MEP on a client port (step 302); creating a Tx entity for a down MEP on each of one or more forwarding line ports and creating a Rx entity for a DOWN MEP on one or more line ports based on received Continuity Check Messages (CCMs) (step 304); exchanging, via associated Tx entities and Rx entities, CCMs with a remote MEP through the one or more line ports (step 306); and processing data from the CCMs from the Rx entities associated with the DOWN MEP on the one or more line ports (step 308). The process 300 can include correlating events from the data to maintain an accurate state of an associated remote MEP (step 310). Optionally, the process 300 includes processing faults from an active DOWN MEP based on monitoring owner slot and logical port information (step 312). The process 300 can also include monitoring for Spanning Tree Protocol or G.8032 Ethernet Ring Protection Protocol state transitions and adjusting CCM transmission on the DOWN MEPs accordingly (step 314).

The DOWN MEP on each of the one or more line ports can be implemented in hardware. The UP MEP can comply with IEEE 802.1ag on one of an E-LINE or E-LAN service. Optionally, at least two of the DOWN MEPs on each of the one or more line ports are located on a different hardware device. The DOWN MEP on each of one or more line ports can be configured to transmit and receive CCMs for the processing step without the involvement of application software until an event is detected based on the CCMs. The UP MEP on the client port can be emulated based on the DOWN MEP on each of one or more line ports.

It will be appreciated that some exemplary embodiments described herein may be implemented or realized in circuitry, logical blocks, modules, circuits, electronic hardware, etc. that can include a general purpose processor, a digital signal processor, a network processor, an Application-Specific Integrated Circuit (ASIC), a Field Programmable Gate Array (FPGA), Programmable Logic Devices (PLDs), discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, some of the exemplary embodiments disclosed herein may be implemented as hardware, software, firmware, or any suitable combinations thereof. To illustrate interchangeability of hardware, firmware, and software, various illustrative components, blocks, modules, circuits, algorithms, and steps have been described above in terms of their functionality. Whether such functionality is implemented in hardware, firmware, and software depends upon the particular application and design constraints, and those skilled in the pertinent art may implement the described functionality in various ways to suit each particular application, but such implementation decisions should not be interpreted as causing a departure from the scope or spirit of the present disclosure. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "processing circuitry configured to" perform the described action.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A node configured to emulate a hardware UP Maintenance End Point (MEP) using one or more DOWN MEPs, the node comprising:
   a plurality of ports;
   a switching fabric configured to switch data between the plurality of ports; and
   processing circuitry communicatively coupled to the plurality of ports and configured to emulate an UP MEP on a first port of the plurality of ports using at least a first DOWN MEP on a second port of the plurality of ports,
   wherein each of a DOWN MEP and an UP MEP face different directions in a network with the DOWN MEP transmitting and receiving Connectivity Fault Management (CFM) frames to and from the network and the UP MEP transmitting and receiving the CFM frames to a bridging function associated with the switching fabric, and
   wherein the at least a first DOWN MEP is implemented in hardware and utilized to emulate the UP MEP in conjunction with executed application software by the processing circuitry to change the direction of the hardware.

2. The node of claim 1, wherein the UP MEP complies with IEEE 802.1ag on one of an Ethernet Line (E-LINE) or Ethernet Local Area Network (E-LAN) service formed in part by the second port.

3. The node of claim 1, wherein the UP MEP is further emulated using a second DOWN MEP on a third port of the plurality of ports, wherein the processing circuitry is configured to create an entity on each of the first DOWN MEP and the second DOWN MEP to transmit and receive Continuity Check Messages (CCMs).

4. The node of claim 3, wherein the processing circuitry is configured to correlate events between the first DOWN MEP and the second DOWN MEP to maintain an accurate state of an associated remote MEP.

5. The node of claim 3, wherein the first DOWN MEP and the second DOWN MEP are each located on a different hardware unit.

6. The node of claim 1, wherein the DOWN MEP is configured to transmit and receive Continuity Check Messages (CCMs) without involvement of application software executed on the processing circuitry until an event is detected based on the CCMs.

7. The node of claim 1, wherein the processing circuitry is configured to emulate the UP MEP based on the first DOWN MEP on the second port and one or more DOWN MEPs, each associated with a port of the plurality of ports.

8. The node of claim 7, wherein the processing circuitry is configured to process faults from an active DOWN MEP of the first DOWN MEP and the one or more DOWN MEPs based on monitoring owner slot and logical port information.

9. The node of claim 1, wherein the processing circuitry is configured to monitor for Spanning Tree Protocol or G.8032 Ethernet Ring Protection Protocol state transitions and adjust Continuity Check Message (CCM) transmission on the first DOWN MEP accordingly.

10. A method, in a node, for emulating an UP Maintenance End Point (MEP) using one or more DOWN MEPs, the method comprising:
    creating the UP MEP on a client port;
    creating a Transmit (Tx) entity for a DOWN MEP on each of one or more forwarding line ports and creating a Receive (Rx) processing entity for a hardware native DOWN MEP on one or more line ports based on received Continuity Check Messages (CCMs);
    exchanging, via associated Tx entities and Rx processing entities, CCMs with one or more remote MEPs through the one or more line ports; and
    processing data from the CCMs by the Rx processing entities associated with the DOWN MEP on the one or more line ports,
    wherein each of a DOWN MEP and an UP MEP face different directions in a network with the DOWN MEP transmitting and receiving Connectivity Fault Management (CFM) frames to and from the network and the UP MEP transmitting and receiving the CFM frames to a bridging function associated with the switching fabric, and
    wherein the at least a first DOWN MEP is implemented in hardware and utilized to emulate the UP MEP in conjunction with executed application software by the processing circuitry to change the direction of the hardware.

11. The method of claim 10, wherein the UP MEP complies with IEEE 802.1ag on one of an Ethernet Line (E-LINE) or Ethernet Local Area Network (E-LAN) service.

12. The method of claim 10, further comprising:
    correlating events from the data to maintain an accurate state of an associated remote MEP.

13. The method of claim 10, wherein at least two DOWN MEPs are located on a different hardware device.

14. The method of claim 10, wherein the Tx entities and the Rx processing entities are configured to transmit and receive CCMs for the processing step without involvement of application software executed on processing circuitry until an event is detected based on the CCMs.

15. The method of claim 10, wherein the UP MEP on the client port is emulated based on the Tx entities and the Rx processing entities.

16. The method of claim 10, further comprising:
    processing faults from an active DOWN MEP based on monitoring owner slot and logical port information.

17. The method of claim 10, further comprising:
    monitoring for Spanning Tree Protocol or G.8032 Ethernet Ring Protection Protocol state transitions and adjusting CCM transmission on the Tx entities accordingly.

18. A network, comprising:
    a plurality of interconnected nodes comprising an Ethernet service between a first node and second node of the plurality of interconnected nodes;
    wherein a plurality of DOWN Maintenance End Points (MEPs) are implemented in hardware on devices used in the Ethernet service; and wherein an UP MEP is emulated between client ports of the Ethernet service using the plurality of DOWN MEPs and circuitry configured to manage and correlate events from the plurality of DOWN MEPs, wherein each of a DOWN MEP and an UP MEP face different directions in a network with the DOWN MEP transmitting and receiving Connectivity Fault Management (CFM) frames to and from the network and the UP MEP transmitting and receiving the CFM frames to a bridging function associated with the switching fabric, and wherein the at least a first DOWN MEP is implemented in hardware and utilized to emulate the UP MEP in conjunction with executed application software by the processing circuitry to change the direction of the hardware.

* * * * *